United States Patent
Rodionov et al.

(10) Patent No.: US 9,512,826 B2
(45) Date of Patent: Dec. 6, 2016

(54) POWER PLANT AND HEAT SUPPLY METHOD

(71) Applicant: KABUSHIKI KAISHA TOSHIBA, Minato-ku, Tokyo (JP)

(72) Inventors: Mikhail Rodionov, Ebina (JP); Nobuo Okita, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 49 days.

(21) Appl. No.: 13/958,808

(22) Filed: Aug. 5, 2013

(65) Prior Publication Data

US 2014/0033707 A1 Feb. 6, 2014

(30) Foreign Application Priority Data

Aug. 6, 2012 (JP) ................. 2012-174411

(51) Int. Cl.
| | |
|---|---|
| *F03G 6/06* | (2006.01) |
| *F03G 6/00* | (2006.01) |
| *F03D 9/00* | (2016.01) |

(52) U.S. Cl.
CPC ............. *F03G 6/005* (2013.01); *F03D 9/006* (2013.01); *Y02E 10/46* (2013.01); *Y02E 10/721* (2013.01); *Y02E 10/725* (2013.01)

(58) Field of Classification Search
CPC ............ H02J 3/46; H02J 3/32; F01B 21/04; F03G 6/005
USPC ............................. 60/641.8–641.15
See application file for complete search history.

(56) References Cited

U.S. PATENT DOCUMENTS

| | | | | |
|---|---|---|---|---|
| 4,103,493 | A | * 8/1978 | Schoenfelder | .......... F03G 6/003 126/629 |
| 4,143,705 | A | * 3/1979 | Awalt, Jr. | .................. F24B 1/18 126/400 |

(Continued)

FOREIGN PATENT DOCUMENTS

| | | |
|---|---|---|
| CN | 201238202 Y | 5/2009 |
| CN | 102400872 A | 4/2012 |

(Continued)

OTHER PUBLICATIONS

Office Action issued in Japanese Patent Application No. 2012-174411 mailed Sep. 1, 2015 (with English translation).

(Continued)

*Primary Examiner* — Thomas Denion
*Assistant Examiner* — Shafiq Mian
(74) *Attorney, Agent, or Firm* — Foley & Lardner LLP

(57) ABSTRACT

According to one embodiment, a power plant includes a solar heat collector which collects solar heat and then supplies the solar heat to a heat medium. The power plant includes a heat exchanger which changes a secondary medium into steam by heat exchange with the heat medium. The power plant includes a turbine. The power plant includes a temperature sensor which detects the temperature of the heat medium. The power plant includes and a controller which supplies the heat medium with heat obtained by the conversion of an output variation component having a period shorter than a predetermined value in electricity generated by a wind power generator when the temperature does not satisfy a predetermined condition associated with the driving of the turbine.

6 Claims, 4 Drawing Sheets

(56) References Cited

U.S. PATENT DOCUMENTS

| | | | | |
|---|---|---|---|---|
| 4,206,608 | A * | 6/1980 | Bell | F03D 9/007 290/4 R |
| 4,977,744 | A * | 12/1990 | Lenz | 60/641.15 |
| 5,384,489 | A * | 1/1995 | Bellac | F03D 9/006 290/44 |
| 6,512,966 | B2 | 1/2003 | Lof et al. | |
| 7,925,387 | B2 * | 4/2011 | Zheng et al. | 700/291 |
| 8,312,733 | B2 * | 11/2012 | Tsarev | F03D 9/006 62/238.3 |
| 2003/0105556 | A1 * | 6/2003 | Enis | F02C 6/16 700/286 |
| 2005/0198959 | A1 * | 9/2005 | Schubert | F03G 6/00 60/641.8 |
| 2005/0279095 | A1 * | 12/2005 | Goldman | F01K 13/00 60/641.8 |
| 2006/0168961 | A1 * | 8/2006 | Alekseevich | F03D 9/007 60/641.8 |
| 2006/0192435 | A1 * | 8/2006 | Parmley | H02J 1/10 307/66 |
| 2008/0022683 | A1 * | 1/2008 | Ohler et al. | 60/641.8 |
| 2008/0303348 | A1 * | 12/2008 | Witters | 307/72 |
| 2009/0076661 | A1 * | 3/2009 | Pearson | H01M 8/04619 700/291 |
| 2010/0175365 | A1 | 7/2010 | Ota | |
| 2010/0195365 | A1 * | 8/2010 | Thyagarajan et al. | 365/94 |
| 2010/0308765 | A1 * | 12/2010 | Moore et al. | 320/103 |
| 2012/0102948 | A1 * | 5/2012 | Nuel et al. | 60/641.2 |
| 2012/0193924 | A1 * | 8/2012 | Okazaki | 290/55 |
| 2012/0300096 | A1 * | 11/2012 | Miki et al. | 348/222.1 |
| 2013/0081394 | A1 * | 4/2013 | Perry | F03G 6/005 60/641.8 |
| 2013/0091842 | A1 * | 4/2013 | Kaufmann et al. | 60/641.8 |
| 2013/0162215 | A1 * | 6/2013 | Cooper | G05B 15/02 320/127 |

FOREIGN PATENT DOCUMENTS

| | | | | |
|---|---|---|---|---|
| IE | WO 2011124657 A1 * | 10/2011 | | G05B 15/02 |
| JP | S50-145935 U | 12/1975 | | |
| JP | S54-052851 A | 4/1979 | | |
| JP | S57-137661 A | 8/1982 | | |
| JP | S58-185911 A | 10/1983 | | |
| JP | H04-219470 A | 8/1992 | | |
| JP | 2007-529665 A | 10/2007 | | |
| JP | 2008-039367 A | 2/2008 | | |
| JP | 2008-184998 A | 8/2008 | | |
| JP | 2008-190447 A | 8/2008 | | |
| JP | 2011-169171 A | 9/2011 | | |
| WO | WO-2007/072591 A1 | 6/2007 | | |

OTHER PUBLICATIONS

"Current status of solar thermal technology and roadmap", New Energy and Industrial Technology Development Organization, NEDO renewable energy technology white paper, Jul. 27, 2010, pp. 253-310, http://www.nedo.go.jp/content/100107273.pdf.

* cited by examiner

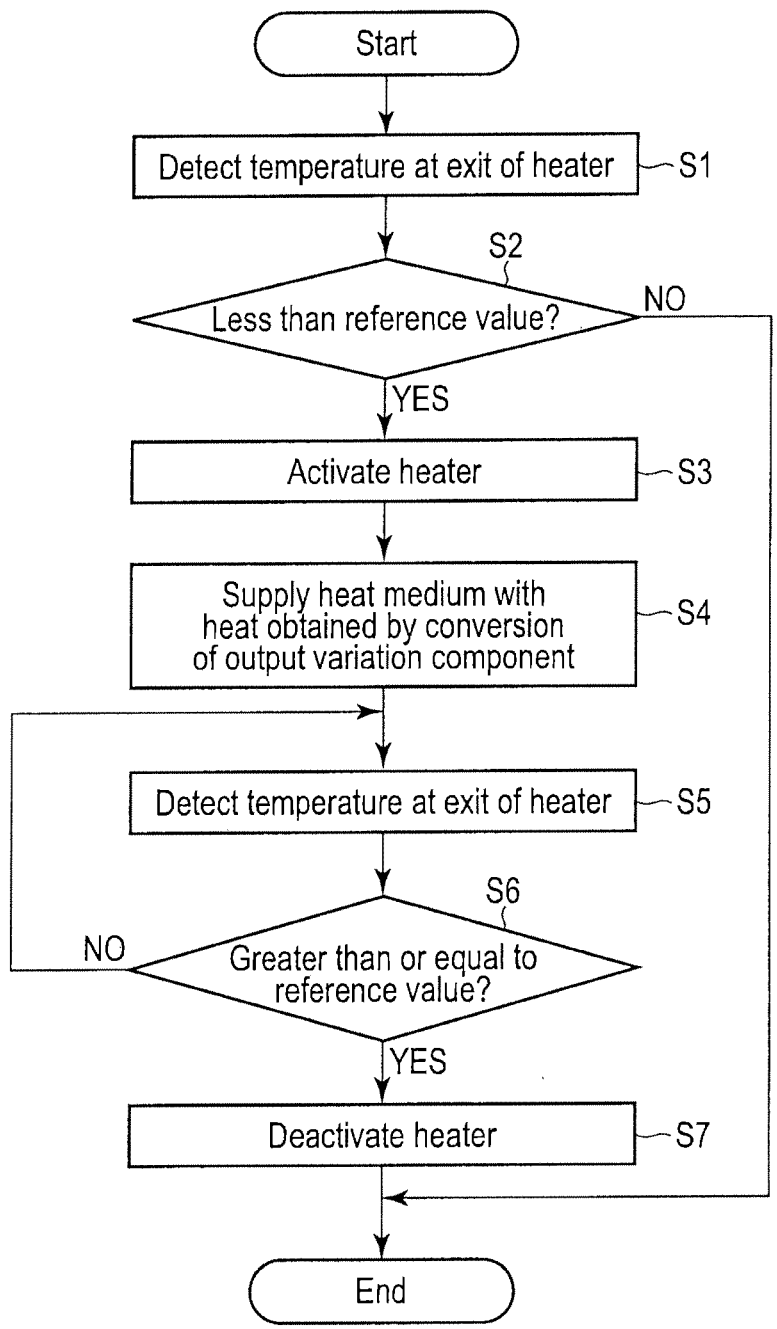
F I G. 2

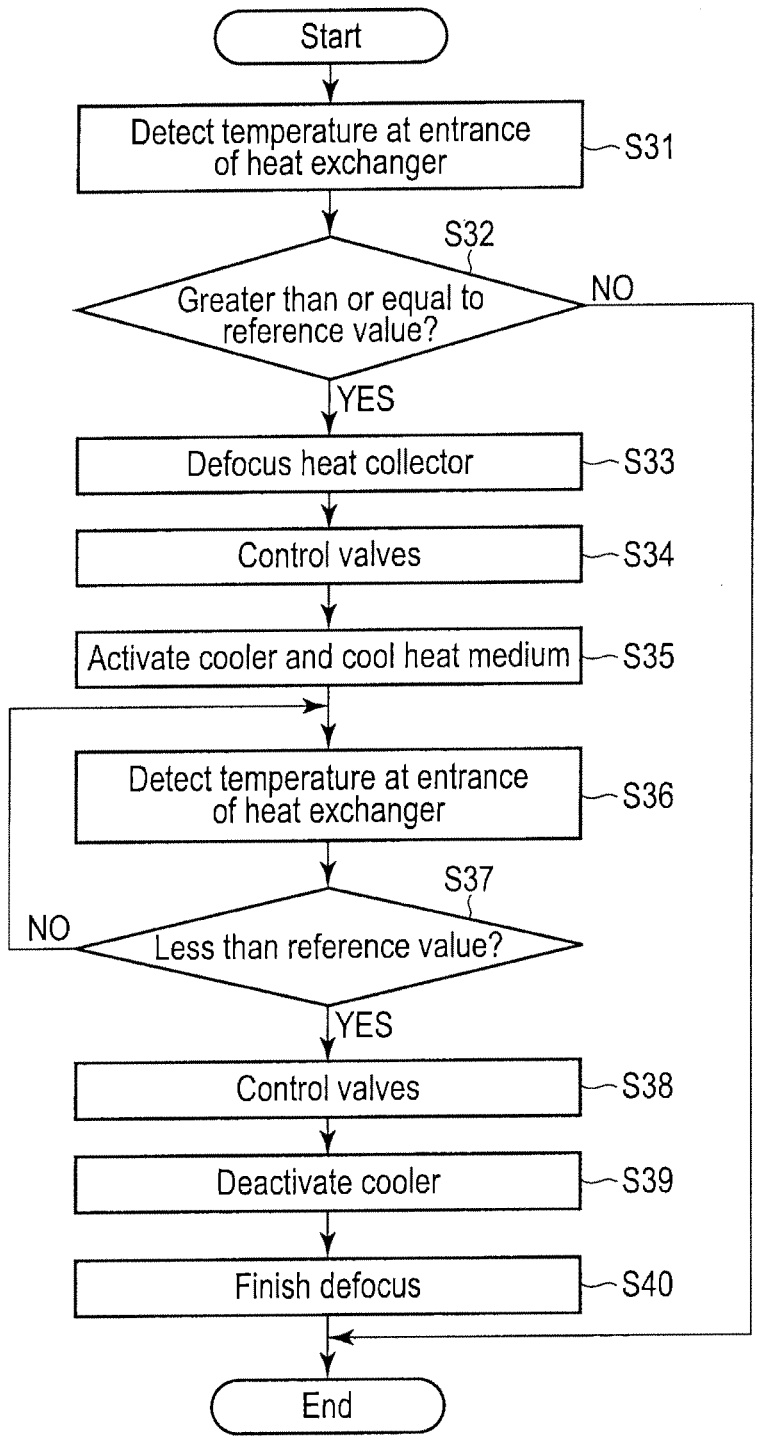
F I G. 4

POWER PLANT AND HEAT SUPPLY METHOD

CROSS-REFERENCE TO RELATED APPLICATIONS

This application is based upon and claims the benefit of priority from Japanese Patent Application No. 2012-174411, filed Aug. 6, 2012, the entire contents of which are incorporated herein by reference.

FIELD

Embodiments described herein relate generally to a power plant that uses wind or solar heat, and a heat supply method.

BACKGROUND

Recently, introduction of electricity generation by renewable energy such as sunlight and wind has been in progress. However, there are problems; for example, the amount of electricity generation considerably fluctuates depending on the strength of wind or the intensity of sunlight, and electricity generation at night is impossible. It is feared that these problems influence on an electric power system. Accordingly, efficient and stable electricity supply adapted to large-scale renewable energy electricity generation has been demanded.

Systems that use renewable energy to efficiently and stably supply electricity include a power plant that uses solar heat.

This power plant uses a solar heat collector to collect solar heat. The power plant feeds the collected heat to a heat exchanger via a heat medium, and changes water into steam by the fed heat. The power plant drives a turbine by the steam and thereby generates electricity.

The heat collected by the solar heat collector can be accumulated by a heat accumulator via the heat medium. The accumulated heat is again fed to the heat exchanger through the heat medium, for example, during night hours when solar heat cannot be collected, so that electricity can be generated. This makes it possible to eliminate the problem of unstable electricity supply which is feared in electricity generation that uses renewable energy.

The following condition needs to be satisfied in order for the power plant that uses solar heat to drive the turbine for efficient electricity generation. This condition is that the temperature of the heat medium supplied with the heat collected by the solar heat collector is greater than or equal to a predetermined temperature and that the flow volume of the heat medium is greater than or equal to a predetermined flow volume.

However, sufficient heat cannot be collected by the solar heat collector because of various factors such as weather, temperature, humidity, and wind, so that the temperature of the heat medium may not become greater than or equal to the predetermined temperature or the flow volume may not become greater than or equal to the predetermined flow volume. Under these circumstances, for efficient electricity generation, it is necessary to feed the heat accumulated by the heat accumulator to the heat medium, or secondarily heat the heat medium by a boiler. In this case, heat that can be used for electricity generation at night is reduced, and further energy is needed to drive the boiler. Therefore, it is not possible to enjoy the benefits of the use of the solar heat to drive the turbine.

BRIEF DESCRIPTION OF THE DRAWINGS

FIG. 2 is a flowchart showing an example of the operation procedure for heating the heat medium by using the heater;

FIG. 4 is a flowchart showing an example of the operation procedure for cooling the heat medium by using the cooler.

DETAILED DESCRIPTION

In general, according to one embodiment, a power plant includes a solar heat collector which collects solar heat and then supplies the solar heat to a heat medium. The power plant includes a heat exchanger which changes a secondary medium into steam by heat exchange with the heat medium. The power plant includes a turbine which is driven by the steam from the heat exchanger. The power plant includes a temperature sensor which detects the temperature of the heat medium supplied with the heat collected by the solar heat collector. The power plant includes and a controller which supplies the heat medium with heat obtained by the conversion of an output variation component having a period shorter than a predetermined value in electricity generated by a wind power generator when the temperature detected by the temperature sensor does not satisfy a predetermined condition associated with the driving of the turbine.

Hereinafter, an embodiment will be described with reference to the drawings.

Figure 1:
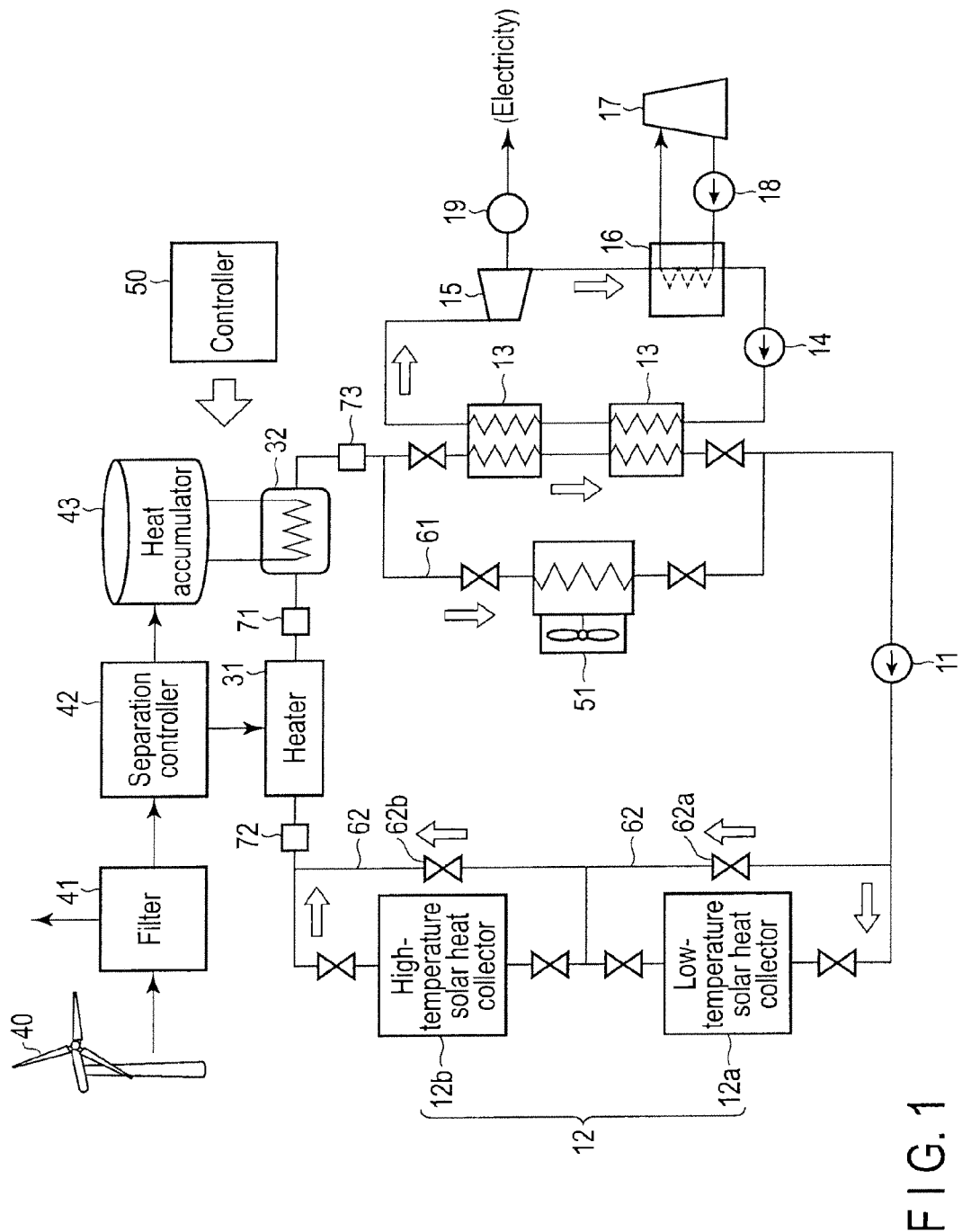
FIG. 1 is a schematic diagram showing an example of a power plant that uses wind and solar heat according to the embodiment.

FIG. 1 is a schematic diagram showing an example of a power plant that uses wind and solar heat according to the embodiment.

A heat medium such as a synthetic oil which serves as a solar heat medium is conveyed by a heat medium pump 11. The heat medium is conveyed to solar heat collectors 12a and 12b from the heat medium pump 11. Solar heat collectors 12a and 12b are devices which collect solar heat and feed the solar heat to the heat medium. Solar heat collectors 12a and 12b may be referred to as a solar heat collector 12.

The heat medium is heated by the radiant heat of solar radiation as the heat collected by solar heat collectors 12a and 12b. The heat medium is then conveyed to a heat exchanger (heater) 13, and heats water or vapor as a medium to be heated in the heat exchanger 13. The heat medium is reduced in temperature in the heat exchanger 13, and then returns to the upstream of the heat medium pump 11. Thus, the heat medium circulates.

Various types of solar heat collectors are available. For example, a trough collection type is used. The trough collection type solar heat collector has a collection mirror and a collection pipe. The collection mirror collects solar radiation to heat the collection pipe. A heat medium flows through the collection pipe. The temperature of the heat medium rises due to radiant heat received by the collection pipe from the solar radiation. Heat medium pipes are respectively connected to the upstream and downstream of the collection pipe.

The heat exchanger 13 changes a secondary medium (for example, low-boiling medium, water) into steam by heat from the heat medium conveyed from solar heat collectors 12a and 12b. The heat exchanger 13 feeds the steam to a turbine 15.

The steam which has passed through the turbine 15 and has been then discharged from the turbine 15 flows into a condenser (steam condenser) 16. The condenser 16 cools the turbine exhaust with cooling water, and condenses the exhaust, and then returns the exhaust to the upstream of a pump 14. Thus, the secondary medium circulates. After a temperature rise in the condenser 16, the cooling water may be cooled by a cooling tower 17 (see FIG. 1) that uses air, and then circulated by a pump 18. Seawater or river water may be used as the cooling water.

A rotary shaft of the turbine 15 is connected to an electric generator 19. This rotary shaft is rotated by a turbine blade which is rotated by inflated steam. As a result of the rotation of the rotary shaft, the electric generator 19 generates electricity.

The aforementioned solar heat collector 12a is a low-temperature solar heat collector, and is provided between the heat medium pump 11 and solar heat collector 12b. Solar heat collector 12b is a high-temperature solar heat collector, and is provided on the slipstream of solar heat collector 12a.

The low-temperature solar heat collector 12a costs less than the high-temperature solar heat collector 12b. The low-temperature solar heat collector 12a has a simple structure, and is therefore easily maintained.

The high-temperature solar heat collector 12b has a vacuum collection pipe comprising a vacuum glass pipe. Solar heat collector 12b radiates less heat resulting from convection and is therefore higher in heat collection efficiency than the low-temperature solar heat collector 12a, but is relatively expensive. The high-temperature solar heat collector 12b has a complex structure, and is therefore difficult to maintain.

Accordingly, on the assumption that the temperature of the heat medium on the downstream side of the solar heat collectors is the same under the same weather condition, the low-temperature solar heat collector 12a is provided without the provision of the high-temperature solar heat collector 12b on the upstream side of the solar heat collector when viewed from the heat medium pump 11. This can keep down the price of the whole solar heat collector fulfilling necessary performance. Maintenance on the upstream side of the solar heat collector is also facilitated.

An example of the temperature change of the heat medium in the circulation of the heat medium is described. For example, a heat medium having a temperature of 250° on the upstream of the heat medium pump 11 is heated to 275° in solar heat collector 12a. The heated heat medium is heated to 300° as the aforementioned target temperature in solar heat collector 12b, and then conveyed to the heat exchanger 13.

In the embodiment, a heater 31 is provided in the power plant. The heater 31 is inserted between the exit of the high-temperature solar heat collector 12b and the entrance of the heat exchanger 13. In the embodiment, a filter 41 is provided in the power plant. The filter 41 separates, from the electricity generated by a wind power generator 40, an output variation component having a period of, for example, several seconds or less which has not heretofore been supplied to a system at weak places of the system. This filter 41 is obtained by a high pass filter (HPF). For example, a power generator for photovoltaic generation may be used as the wind power generator 40 in FIG. 1.

The output variation component from the filter 41 is separated by a separation controller 42 as needed, and supplied to the heater 31 and a heat accumulator 43. The electricity other than the output variation component separated by the filter 41 from the electricity generated by the wind power generator 40 is supplied to the system.

The heat accumulator 43 converts the output variation component of the electricity supplied from the separation controller 42 to heat, for example, by an electrothermal heater or an electric heater with a casing pipe. The heat accumulator 43 accumulates the heat obtained by the conversion in a heat accumulation medium such as molten salt or concrete. Thus, it is possible to accumulate heat obtained by taking advantage of the output variation component of the electricity generated by the use of renewable energy.

A temperature sensor 71 is provided at the exit of the heater 31. A temperature sensor 72 is provided at the entrance of the heater 31. A temperature sensor 73 is provided at the entrance of the heat exchanger 13.

Now, the operation of the heater 31 is described.

A controller 50 operates the heater 31 as needed. The heater 31 converts the aforementioned output variation component to heat. The heater 31 supplies the heat obtained by the conversion to the heat medium, conveyed from the high-temperature solar heat collector 12b, and thereby raises the temperature of the heat medium.

The heater 31 needs to be operated, for example, when solar heat collectors 12a and 12b are activated after deactivated and when heat input to solar heat collectors 12a and 12b by sunlight is insufficient.

Between the deactivation and activation of solar heat collectors 12a and 12b, the viscosity of the heat medium is likely to increase when the temperature of the heat medium is low or at night or in winter.

When heat input to solar heat collectors 12a and 12b by sunlight is insufficient because of cloudy weather or rainy weather after solar heat collectors 12a and 12b have been activated, the temperature of the heat medium cannot be raised to the target temperature to efficiently drive the turbine 15.

Thus, in the embodiment, characteristics of a several-minute time delay from the heat collection by solar heat collectors 12a and 12b to the heat generation are used. The controller 50 activates the heater 31 when the temperature of the heat medium detected by the temperature sensor 71 at the exit of the heater 31 is less than a reference value after solar heat collectors 12a and 12b have been activated. Thus, the heat from the heater 31 is supplied to the heat medium conveyed from the high-temperature solar heat collector 12b. The viscosity of the heat medium is reduced and the temperature of the heat medium is raised to a predetermined target value by the supply of the heat to the heat medium. This heat medium is used for electricity generation by the turbine 15. The reference value for activating the heater 31 is set to a value less than or equal to the aforementioned target temperature to efficiently drive the turbine 15.

A heat exchanger 32 is provided to be inserted between the high-temperature solar heat collector 12b and the heat exchanger 13. In the example shown in FIG. 1, the heat exchanger 32 is provided between the temperature sensor 71 and the temperature sensor 73. For example, at night or when it is cloudy, the controller 50 cannot raise the temperature to the temperature to efficiently drive the turbine 15 simply by the use of the heat collected by solar heat collectors 12a and 12b or the heat supplied from the heater 31. In this case, the controller 50 feeds the heat from the heat accumulator 43 to the heat exchanger 32. Thus, the temperature of the heat medium conveyed from the heater 31 is raised. As a result, even when the heat collected by solar heat collectors 12a and 12b is not sufficient, the temperature of the heat medium can be raised by the heat obtained from the output variation component of the electricity generated by the use of renewable energy.

The output variation component, having a period of, for example, several seconds or less, of the electricity generated by the use of renewable energy is not suited for supply as it is. Therefore, the output variation component has not heretofore been targeted for supply to the system at weak places of the system. However, in the embodiment, the heat obtained by the conversion of this output variation component is supplied to the heat medium, and this heat medium can be used to drive the turbine 15. Thus, it is possible to take full advantage of the electricity which has not heretofore been supplied to the system at weak places of the system. When the output variation component is supplied to the heat medium, the period of the heat variation is less than the period of the original output variation component because of the heat diffusion to the heat medium. Consequently, there are no problems associated with electric power supply.

For example, suppose that the heat medium having a temperature of 250° on the upstream of the heat medium pump 11 is only heated to 275° at the entrance of the turbine because of cloudy weather even when heated by solar heat collectors 12a and 12b. In this case, the heater 31 and the heat exchanger 32 are used to raise the temperature of the heat medium by 25°. As a result, the heat medium can be heated to a target temperature of 300° and then conveyed to the heat exchanger 13.

As described above, the output variation component from the filter 41 is separated by the separation controller 42 and then supplied to the heater 31 and the heat accumulator 43. However, when the heater 31 is inactive, that is, when the heat medium does not need to be heated, the separation controller 42 supplies the output variation component from the filter 41 not to the heater 31 but to the heat accumulator 43.

Suppose that the temperature of the heat medium detected by the temperature sensor 71 at the exit of the heater 31 is less than the aforementioned reference value after the activation of the heater 31. In this case, in order to put the heating of the heat medium before the heat accumulation, the separation controller 42 supplies at least of part of the output variation component from the filter 41 not to the heat accumulator 43 but to the heater 31.

Suppose that the temperature of the heat medium detected by the temperature sensor 71 at the exit of the heater 31 is greater than or equal to the aforementioned reference value after the activation of the heater 31. In this case, in order to finish the heating of the heat medium and then accumulate heat, the separation controller 42 supplies the output variation component from the filter 41 not to the heater 31 but to the heat accumulator 43.

In the present embodiment, a heat medium pipe 61 through which to put a cooler (cooling equipment) 51 for cooling the heat medium is provided parallel to a heat medium pipe which passes through the heat exchanger 13. When viewed from the heat medium pump 11, a bypass heat medium pipe 62 for the bypass conveyance of the heat medium from the heat medium pump 11 is provided in parallel between the entrance and exit of solar heat collector 12a and between the entrance and exit of solar heat collector 12b. The bypass conveyance means supplying the heat medium from the heat medium pump 11 not to the solar heat collector 12 but to the bypass heat medium pipe 62.

Now, the bypass conveyance of the heat medium using the bypass heat medium pipe 62 is described.

The bypass heat medium pipe 62 has a first bypass heat medium pipe for bypassing between the downstream the heat medium pump 11 and the connection of solar heat collectors 12a and 12b. The bypass heat medium pipe 62 also has a second bypass heat medium pipe for bypassing between the connection of solar heat collectors 12a and 12b and the entrance of the heater 31. A total of ten valves for adjusting the conveyance volume of the heat medium are provided at the entrance and exit of solar heat collector 12a, at the entrance and exit of solar heat collector 12b, in the first bypass heat medium pipe of the bypass heat medium pipe 62, in the second bypass heat medium pipe of the bypass heat medium pipe 62, at the entrance and exit of the heat exchanger 13, and at the entrance and exit of the cooler 51. The valve of the first bypass heat medium pipe is referred to as valve 62a. The valve of the second bypass heat medium pipe is referred to as valve 62b.

When the temperature of the heat medium supplied with the heat from solar heat collectors 12a and 12b is high, for example, because the temperature of the radiant heat of solar radiation to solar heat collectors 12a and 12b is higher than normal, this heat medium deteriorates or is decomposed. In this high-temperature condition, the temperature of the radiant heat is much higher than the target temperature to efficiently drive, for example, the turbine 15.

Thus, in the embodiment, if the temperature of the heat medium detected by the temperature sensor 72 at the entrance of the heater 31 is greater than or equal to a reference value as a threshold that requires the reduction of the temperature of the heat medium, the controller 50 brings solar heat collectors 12a and 12b out of focus, that is, defocuses solar heat collectors 12a and 12b. As a result, the temperature of the heat medium at the entrance of the heat exchanger 13 can be reduced. The control for bringing solar heat collectors 12a and 12b out of focus is also referred to as automatic dump control. As this reference value, a value that exceeds the target temperature to efficiently drive, for example, the turbine 15 is set.

When the temperature of the heat medium is greater than or equal to the aforementioned threshold even after the defocus, it is necessary to prevent the heat medium from being heated by the low-temperature solar heat collector 12a depending on the current temperature of the heat medium. In this case, at least of part of the heat medium from the heat medium pump 11 needs to be supplied to the heater 31 through the first bypass heat medium pipe of the bypass heat medium pipe 62 and the high-temperature solar heat collector 12b without passing through the low-temperature solar heat collector 12a. Thus, the controller 50 controls to reduce the temperature of the heat medium to less than the aforementioned threshold by opening and closing a total of six valves: the valves at the entrance and exit of solar heat collector 12a, the valves at the entrance and exit of solar heat collector 12b, valve 62a in the first bypass heat medium pipe of the bypass heat medium pipe 62, and valve 62b in the second bypass heat medium pipe of the bypass heat medium pipe 62. As a result, the deterioration and decomposition of the heat medium can be prevented.

At least of part of the heat medium from the heat medium pump 11 needs to be supplied to the heater 31 through the low-temperature solar heat collector 12a and the second bypass heat medium pipe of the bypass heat medium pipe 62 without passing through the high-temperature solar heat collector 12b depending on the current temperature of the heat medium so that the heat medium is not heated by the high-temperature solar heat collector 12b. Thus, the controller 50 controls to reduce the temperature of the heat medium to less than the aforementioned threshold by opening and closing a total of six valves.

For example, the bypass conveyance using the bypass heat medium pipe 62 is not conducted. In this case, even if the temperature of the heat medium after heated by solar heat collectors 12a and 12b is, for example, 310° or more as the threshold, it is possible to inhibit the heating of the heat medium and reduce the temperature of the heat medium to less than 310° as the threshold by conducting the bypass conveyance using the bypass heat medium pipe 62.

When the temperature of the heat medium needs to be raised only by the heat from the heater 31 or the heat from the heat accumulator 43, for example, at night, the temperature of the heat medium is reduced by heat radiation if the heat medium is put through solar heat collectors 12a and 12b which cannot collect heat. Therefore, to prevent this reduction, the controller 50 opens and closes the aforementioned valves so that at least of part of the heat medium from the heat medium pump 11 will be supplied to the heater 31 through the first and second bypass heat medium pipes of the bypass heat medium pipe 62 without passing through solar heat collectors 12a and 12b.

Now, the cooling of the heat medium using the cooler 51 is described.

If an emergency arises, for example, if the temperature of the heat medium sharply rises, the temperature detected by the temperature sensor 73 at the entrance of the heat exchanger 13 becomes greater than or equal to the reference value, and the heat medium and the medium on the turbine side are likely to deteriorate or be decomposed. In this case, after defocusing solar heat collectors 12a and 12b, the controller 50 controls to close the valves at the entrance and exit of the heat exchanger 13 and open the valves at the entrance and exit of the cooler 51 so that the heat medium flows through the heat medium pipe 61 on the side of the cooler 51, thereby reducing the temperature of the heat medium running through the heat exchanger 13 to less than a reference value and then feeding the heat medium to the heat medium pump 11 from the exit of the cooler 51. As this reference value, a value that exceeds the target temperature to efficiently drive, for example, the turbine 15 is set.

In the embodiment, when the power plant is out service, the controller 50 opens and closes the valves at the entrance and exit of the heat exchanger 13 and the valves at the entrance and exit of the cooler 51, and then passes the heat medium through the heat medium pipe 61 on the side of the cooler 51. Thus, the controller 50 can reduce the temperature of the heat medium to less than the reference value and then feed the heat medium to the heat medium pump 11 from the exit of the cooler 51. Consequently, the deterioration and decomposition of the heat medium and the medium on the turbine side can be prevented.

For example, when the cooler 51 is inactive, the temperature of the heat medium conveyed to the heat exchanger 13 has become greater than or equal to 310° as the reference value. Even in this case, the cooler 51 can be used to cool the heat medium and thereby reduce the temperature of the heat medium conveyed to the heat exchanger 13 to less than 310° as the reference value.

Various operation procedures are described below. FIG. 2 is a flowchart showing an example of the operation procedure for heating the heat medium by using the heater.

In an initial condition, the heater 31 is inactive. After activating solar heat collectors 12a and 12b, the controller 50 acquires the result of the detection by the temperature sensor 71 at the exit of the heater 31 and thereby detects the temperature of the heat medium (step S1). When the detected temperature is less than the reference value to efficiently drive the turbine 15 (YES in step S2), the controller 50 activates the heater 31 (step S3), and supplies the heat from the heater 31 to the heat medium conveyed from the high-temperature solar heat collector 12b. Thus, the controller 50 reduces the viscosity of the heat medium and raises the temperature of the heat medium (step S4). Here, when the temperature of the heat medium is less than the reference value even if the heater 31 is activated, the controller 50 may control to supply the heat from the heat accumulator 43 to the heat exchanger 32 and thereby further raise the temperature of the heat medium conveyed from the heater 31.

The controller 50 then acquires the result of the detection by the temperature sensor 71 at the exit of the heater 31 and thereby again detects the temperature of the heat medium (step S5). When the detected temperature is greater than or equal to the reference value to efficiently drive the turbine 15 (YES in step S6), the controller 50 deactivates the heater 31 (step S7). Thus, the controller 50 finishes the heating of the heat medium by the heat from the heater 31.

As described above, in the embodiment, when the temperature of the heat medium is less than the reference value to efficiently drive the turbine 15, the heat converted from the output variation component of the electricity generated by the use of renewable energy is supplied to the heat medium, so that the temperature of the heat medium can be raised to the reference value. Thus, even when the temperature of the heat medium cannot be raised to the reference value only by the solar heat, for example, at night or in cloudy weather, the temperature of the heat medium can be raised to the reference value. As a result, electricity can be stably generated by the use of solar heat.

Figure 3:
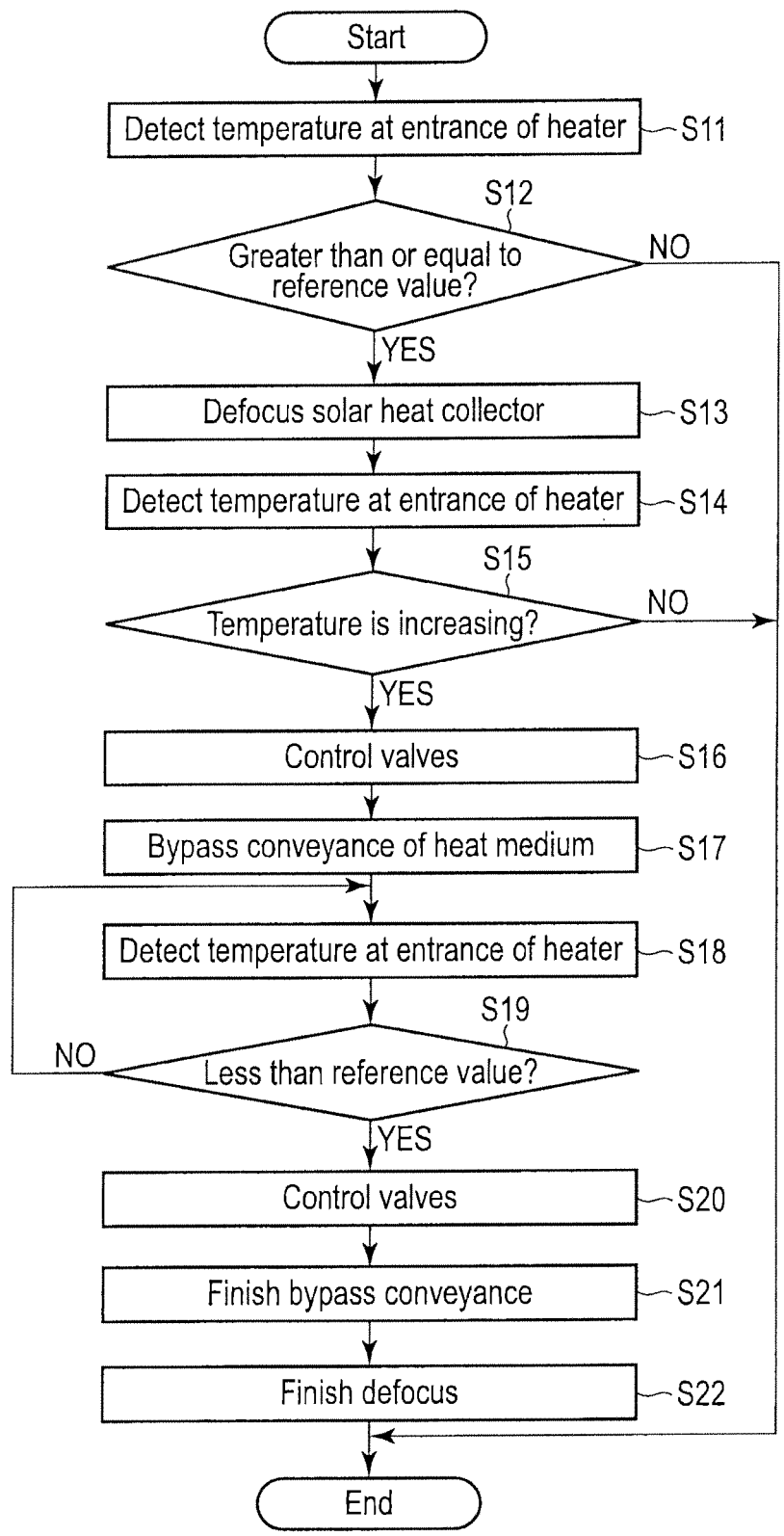
FIG. 3 is a flowchart showing an example of the operation procedure for the bypass conveyance of the heat medium according to the embodiment.

FIG. 3 is a flowchart showing an example of the operation procedure for the bypass conveyance of the heat medium according to the embodiment.

Here, the heater 31 and the heat exchanger 32 are inactive. The controller 50 acquires the result of the detection by the temperature sensor 72 at the entrance of the heater 31 and thereby detects the temperature of the heat medium (step S11). The temperature detected in the operation procedure for the bypass conveyance of the heat medium may be the temperature indicated by the result of the detection by the temperature sensor 73 at the entrance of the heat exchanger 13. When the detected temperature of the heat medium is greater than or equal to the reference value as a threshold to cool the heat medium (YES in step S12), the controller 50 defocuses solar heat collectors 12a and 12b (step S13).

The controller 50 then acquires the result of the detection by the temperature sensor 72 at the entrance of the heater 31 and thereby again detects the temperature of the heat medium (step S14). When the detected temperature of the heat medium is increasing (YES in step S15), it is necessary to eliminate the rise of the temperature of the heat medium caused by the low-temperature solar heat collector 12a depending on the current temperature of the heat medium. In this case, the controller 50 opens and closes the valves at the entrance and exit of solar heat collector 12a, the valves at the entrance and exit of solar heat collector 12b, valve 62a in the first bypass heat medium pipe of the bypass heat medium pipe 62, and valve 62b in the second bypass heat medium pipe of the bypass heat medium pipe 62. By the opening and closing of the valves, the controller 50 controls to conduct the bypass conveyance of at least of part of the heat medium supplied to the solar heat collector 12 and reduce the temperature of the heat medium (step S17).

When the temperature of the heat medium detected in S11 is greater than or equal to the reference value, the controller 50 may defocus solar heat collectors 12a and 12b and also start the bypass conveyance of the heat medium.

The controller 50 then acquires the result of the detection by the temperature sensor 72 at the entrance of the heater 31 and thereby again detects the temperature of the heat medium (step S18). When the detected temperature of the heat medium is less than the reference value (YES in step S19), the controller 50 opens the valves at the entrance and exit of solar heat collector 12a, and the valves at the entrance and exit of solar heat collector 12b. Further, the controller 50 closes valve 62a in the first bypass heat medium pipe of the bypass heat medium pipe 62, and valve 62b in the second bypass heat medium pipe of the bypass heat medium pipe 62 (step S20). The controller 50 finishes the bypass conveyance of the heat medium by the opening and closing of the valves (step S21).

The controller 50 then finishes the defocusing of solar heat collectors 12a and 12b (step S22).

When the temperature of the heat medium detected in S18 is less than the reference value, the controller 50 may finish the bypass conveyance of the heat medium and also finish the defocusing of solar heat collectors 12a and 12b.

As described above, the power plant according to the present embodiment conducts the bypass conveyance of the heat medium by using the bypass heat medium pipe provided parallel to the solar heat collector when the temperature of the heat medium is greater than or equal to the reference value that requires the cooling of the heat medium, for example, because the temperature of the radiant heat of solar radiation to solar heat collectors 12a and 12b is higher than normal. Consequently, the temperature of the heat medium can be reduced to less than the reference value, and the deterioration and decomposition of the heat medium can therefore be prevented.

FIG. 4 is a flowchart showing an example of the operation procedure for cooling the heat medium by using the cooler.

Here, the heater 31 and the heat exchanger 32 are inactive. The cooler 51 is inactive in an initial condition. The controller 50 acquires the result of the detection by the temperature sensor 73 at the entrance of the heat exchanger 13 and thereby detects the temperature of the heat medium (step S31). When the detected temperature of the heat medium is greater than or equal to the reference value as a threshold to cool the heat medium (YES in step S32), the controller 50 defocuses solar heat collectors 12a and 12b (step S33).

The controller 50 controls to close the valves at the entrance and exit of the heat exchanger 13 and open the valves at the entrance and exit of the cooler 51 (step S34). Further, the controller 50 activates the cooler 51. As a result, at least of part of the heat medium supplied to the entrance of the heat exchanger 13 flows through the heat medium pipe 61 on the side of the cooler 51. Thus, the controller 50 can reduce the temperature of the heat medium conveyed to the entrance of the heat exchanger 13 and then feed this heat medium to the heat medium pump 11 from the exit of the cooler 51 (step S35).

The controller 50 then acquires the result of the detection by the temperature sensor 73 at the entrance of the heat exchanger 13 and thereby again detects the temperature of the heat medium (step S36). When the detected temperature is less than the reference value (YES in step S37), the controller 50 controls to open the valves at the entrance and exit of the heat exchanger 13 and close the valves at the entrance and exit of the cooler 51 (step S39). Further, the controller 50 deactivates the cooler 51. As a result, the heat medium can be put through the heat exchanger 13 without being passed through the heat medium pipe 61 on the side of the cooler 51. Further, the controller 50 finishes the defocusing of solar heat collectors 12a and 12b (step S40).

As described above, the power plant according to the present embodiment cools the heat medium by using the cooler 51 provided parallel to the heat exchanger 13 if an emergency arises, for example, if the temperature of the heat medium sharply rises and the temperature of the heat medium at the entrance of the heat exchanger 13 becomes greater than or equal to the reference value. The temperature of the heat medium can be reduced to less than the reference value by the cooling. Consequently, the deterioration and decomposition of the heat medium and the medium on the turbine side can be prevented.

In the embodiment, the heat accumulator 43 is configured to accumulate the heat obtained by the conversion of the electricity generated by the wind power generator 40. However, this is not a limitation. For example, the heat accumulator 43 may be provided under the heater 31 so that the heat accumulator 43 not only serves as a heat accumulator of the heat originating from the electricity obtained by using renewable energy but also serves as a solar heat accumulator. This configuration can improve the efficiency of solar heat use.

In the embodiment, the cooler 51 is provided parallel to the entrance and exit of the heat exchanger 13 so that the cooler 51 operates in accordance with the detection by the temperature sensor 73 at the entrance of the heat exchanger 13. However, this is not a limitation. For example, the heat medium pipe 61 through which to put the cooler 51 may be provided between the entrance of the heat exchanger 13 and the temperature sensor 72 at the entrance of the heater 31—the heater 31 so that the cooler 51 operates in accordance with the detections by the temperature sensor 72 and the temperature sensor 73. This configuration allows a temperature rise in the heat medium to be detected closer to the upstream side so that the deterioration of the heat medium can be efficiently prevented.

In the embodiment described, in the bypass conveyance of the heat medium when the temperature of the heat medium is greater than or equal to the threshold, the temperature of the heat medium is reduced by the defocusing of solar heat collectors 12a and 12b and the bypass conveyance using the bypass heat medium pipe 62. However, this is not a limitation. For example, the temperature of the heat medium may be reduced merely by the defocusing of solar heat collectors 12a and 12b without the bypass conveyance using the bypass heat medium pipe 62. Alternatively, the temperature of the heat medium may be reduced merely by the bypass conveyance using the bypass heat medium pipe 62 without the defocus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power plant comprising:
a solar heat collector that collects solar heat and then supplies the solar heat to a heat medium;
a heat exchanger that changes a secondary medium into steam by heat exchange with the heat medium;
a turbine that is driven by the steam from the heat exchanger;
a temperature sensor that detects a temperature of the heat medium supplied with the solar heat collected by the solar heat collector;
a wind power generator that generates electricity;
a filter that separates the electricity into a first electricity component supplied to an electric power system and a second electricity component not supplied to the electric power system, the second electricity component being an output variation component having a period shorter than a predetermined value;
a heater that converts the output variation component into heat, and supplies the heat obtained by the conversion to the heat medium;
a heat accumulator that converts the output variation component into heat and accumulates the heat obtained by the conversion of the output variation component;
a second heat exchanger that provides the heat medium with the heat accumulated by the heat accumulator;
a separation controller configured to:
 (a) supply the output variation component to the heat accumulator and not to the heater, when the temperature of the heat medium detected by the temperature sensor satisfies the predetermined condition, and
 (b) supply the output variation component to the heater and not to the heat accumulator, when the temperature of the heat medium detected by the temperature sensor does not satisfy the predetermined condition; and
a controller configured to:
 (c) activate the heater when the temperature of the heat medium detected by the temperature sensor does not satisfy the predetermined condition, and
 (d) provide the heat accumulated by the heat accumulator to the second heat exchanger in order to raise the temperature of the heat medium, when the temperature of the heat medium detected by the temperature sensor does not satisfy the predetermined condition after the activation of the heater.

2. The power plant according to claim 1, further comprising:
a heat medium pipe provided parallel to the solar heat collector; and
a second temperature sensor that detects a temperature of heat medium supplied to the solar heat collector,
wherein when the temperature of the heat medium detected by the second temperature sensor satisfies a predetermined condition that requires a reduction of the temperature of the heat medium, the controller is configured to perform a control in which at least part of the heat medium supplied to the solar heat collector is supplied to the heat medium pipe.

3. The power plant according to claim 1, further comprising:
a cooler that cools heat medium supplied to the heat exchanger; and
a third temperature sensor that detects a temperature of the heat medium supplied to the heat exchanger,
wherein when the temperature of the heat medium detected by the third temperature sensor satisfies a predetermined condition that requires a cooling of the heat medium supplied to an entrance of the heat exchanger, the controller is configured to perform a control in which the cooler is supplied with at least part of the heat medium supplied to the entrance of the heat exchanger.

4. The power plant according to claim 1, wherein the solar heat collector comprises:
a first solar heat collector that raises a temperature of heat medium supplied to the heat exchanger to a predetermined temperature lower than a temperature that satisfies the predetermined condition, and
a second solar heat collector that raises the temperature of the heat medium that has passed through the first solar heat collector to the temperature that satisfies the predetermined condition.

5. A heat supply method applied to a power plant comprising a solar heat collector that collects solar heat and then supplies the solar heat to a heat medium; a heat exchanger that changes a secondary medium into steam by heat exchange with the heat medium; a turbine that is driven by the steam from the heat exchanger; a temperature sensor that detects a temperature of the heat medium supplied with the solar heat collected by the solar heat collector; a wind power generator that generates electricity; a filter that separates the electricity into a first electricity component supplied to an electric power system and a second electricity component not supplied to the electric power system, the second electricity component being an output variation component having a period shorter than a predetermined value; a heater that converts the output variation component into heat and supplies the heat obtained by the conversion to the heat medium; a heat accumulator that converts the output variation component into heat and accumulates heat obtained by a conversion of the output variation component; and a second heat exchanger that provides the heat medium with the heat accumulated by the heat accumulator, the heat supply method comprising:
 (a) supplying the output variation component to the heat accumulator and not to the heater, when the temperature of the heat medium detected by the temperature sensor satisfies the predetermined condition;
 (b) supplying the output variation component to the heater and not to the heat accumulator, when the temperature of the heat medium detected by the temperature sensor does not satisfy the predetermined condition;
 (c) activating the heater when the temperature of the heat medium detected by the temperature sensor does not satisfy the predetermined condition; and
 (d) providing the heat accumulated by the heat accumulator to the second heat exchanger in order to raise the temperature of the heat medium, when the temperature of the heat medium detected by the temperature sensor does not satisfy the predetermined condition after the activation of the heater.

6. A power plant comprising:
a wind power generator that generates electricity;
a filter that separates the electricity into a first electricity component supplied to an electric power system and a second electricity component not supplied to the electric power system, the second electricity component being an output variation component having a period shorter than a predetermined value;

a heater that converts the output variation component into heat, and supplies the heat obtained by the conversion to the heat medium;

a temperature sensor that detects a temperature of a heat medium;

a heat accumulator that converts the output variation component into heat and accumulates the heat obtained by the conversion of the output variation component;

a heat exchanger that provides the heat medium with the heat accumulated by the heat accumulator when the detected temperature of the heat medium does not satisfy the predetermined condition after the start of the supply of the heat obtained by the conversion of the output variation component to the heat medium;

a separation controller configured to:
  (a) supply the output variation component to the heat accumulator and not the heater, when the temperature of the heat medium detected by the temperature sensor satisfies the predetermined condition; and
  (b) supply the output variation component to the heater and not to the heat accumulator, when the temperature of the heat medium detected by the temperature sensor does not satisfy the predetermined condition; and a controller configured to:
  (c) activate the heater when the temperature of the heat medium detected by the temperature sensor does not satisfy the predetermined condition; and
  (d) provide the heat accumulated by the heat accumulator to the heat exchanger in order to raise the temperature of the heat medium, when the temperature of the heat medium detected by the temperature sensor does not satisfy the predetermined condition after the activation of the heater.

* * * * *